United States Patent [19]

Ida

[11] Patent Number: 4,839,125
[45] Date of Patent: Jun. 13, 1989

[54] PROCESS FOR PREPARATION OF LIGHT-DIFFUSING METHACRYLIC RESIN PLATES

[75] Inventor: Kozo Ida, Otake, Japan

[73] Assignee: Mitsubishi Rayon Co., Ltd., Tokyo, Japan

[21] Appl. No.: 49,776

[22] Filed: May 12, 1987

[30] Foreign Application Priority Data

May 16, 1986 [JP] Japan .................................. 61-112137

[51] Int. Cl.$^4$ ...................... B29C 39/16; B29D 11/00
[52] U.S. Cl. .................................. 264/216; 264/1.6; 264/73
[58] Field of Search ........................... 264/216, 1.6, 73

[56] References Cited

U.S. PATENT DOCUMENTS

| | | |
|---|---|---|
| 3,410,934 | 11/1968 | Kuritzkes et al. . |
| 3,422,178 | 1/1969 | Junker et al. ........................ 264/216 |
| 3,600,490 | 8/1971 | Billingsley et al. .................. 264/216 |
| 4,041,120 | 8/1977 | Oshima et al. ....................... 264/216 |
| 4,232,078 | 11/1980 | Kamada . |
| 4,415,509 | 11/1983 | Toyooka et al. ...................... 264/1.6 |

FOREIGN PATENT DOCUMENTS

| | | |
|---|---|---|
| 0073450 | 3/1983 | European Pat. Off. . |
| 12272 | 1/1977 | Japan .................................. 264/216 |
| 55-41289 | 3/1980 | Japan . |
| 269993 | 6/1964 | Netherlands . |
| 279820 | 11/1964 | Netherlands . |
| WO85/05314 | 12/1985 | World Int. Prop. O. .......... 264/216 |

OTHER PUBLICATIONS

Patent Abstracts of Japan, vol. 4, No. 80 (M-15), [562], Jun. 10, 1980, M. Field.

*Primary Examiner*—James Lowe
*Attorney, Agent, or Firm*—Brumbaugh, Graves, Donohue & Raymond

[57] ABSTRACT

Light-diffusing methacrylic plates are continuously prepared by casting a polymerizable material composed of methyl methacrylate or a partially polymerized product thereof with 0.2 to 3.0% by weight of a light diffusing material between two belts. The belts are separated by an average distance l but are capable of both compression and expansion relative to this average separation. The method involves applying compression at at least one point in the casting space to reduce the separation distance and then allowing expansion back to a maximum distance wherein the maximum spacing between the belts is from $(l+1)$ mm to $(l+0.2)$ mm and the minimum spacing during compression is from $(l-1)$ mm to $(l-0.2)$ mm.

7 Claims, 1 Drawing Sheet

PROCESS FOR PREPARATION OF LIGHT-DIFFUSING METHACRYLIC RESIN PLATES

BACKGROUND OF THE INVENTION (1) Field of the Invention

The present invention relates to a process for the preparation of a light-diffusing methacrylic resin plate characterized in that the solar radiation transmittance is lower than the luminous transmittance thereof.

(2) Description of the Related Art

A process for preparing a polymer sheet having a pearl-like luster by polymerizing a mixture of an unsaturated monomer (hereinafter referred to as "monomer") composed mainly of methyl methacrylate and a leaf having a laminar structure, such as basic lead carbonate, a fish scale foil, bismuth trichloride or titanium dioxide-coated mica, is known. For example, there can be mentioned processes disclosed in Japanese Examined Patent Publications No. 31-9,355 and No. 33-294, that is, a process in which a polymerizable liquid material comprising a monomer and a leafy diffusing agent is cast in a plate-form casting mold, the leaf is appropriately arranged by applying an alternating current or direct current voltage to electrodes disposed on the inner or outer surface of the casting mold while giving an electromagnetic vibration, an impact force or impact mechanical vibration to the outside or interior of the casting mold, and polymerization is carried out in this state, and a process in which the casting mold is moved in predetermined directions while the liquid material is still in the flowable state. These processes, however, have problems in that the operation is batchwise, the equipment and economical costs are high, and the luster becomes uneven. As an epoch-making means for obtaining a sheet or plate having a uniform performance, a process was proposed in which, while the polymerizable liquid material is polymerized and solidified between confronting belts for the continuous production of a sheet or plate, an appropriate linear load is applied in the lateral direction of the belts (Japanese Unexamined Patent Publication No. 55-41,289).

However, these conventional processes intend only to obtain a pearl-like luster, and the light transmission of the product is low, and even if the light transmission is increased by reducing the amount of the leaf added, no substantial difference is found between the luminous transmittance and the solar radiation transmittance.

A light-diffusing plate comprising inorganic light-diffusing fine particles of barium sulfate, aluminum hydroxide, calcium carbonate or silicon dioxide, or fine particles of a transparent polymer having a refractive index different from that of the base resin, is disclosed, for example, in Japanese Unexamined Patent Publication No. 53-98,354. In the product obtained according to this process, there is no substantial difference between the luminous transmittance and the solar radiation transmittance, or the luminous transmittance is lower than the solar radiation transmittance. As a means for reducing the solar radiation transmittance below the visual transmittance, a process is known in which an alternating layer structure comprising a thin layer of a dielectric substance having a high refractive index and an optically multi-layered interference film is formed as the top layer on a substrate having a high transparency (Japanese Unexamined Patent Publications No. 51-118,451, No. 56-28,488, and No. 53-81,144). However, this process has problems in that, since vapor deposition or sputtering on the surface of a transparent plate is necessary, the manufacturing cost is high and the durability of the multi-layered film is unsatisfactory.

SUMMARY OF THE INVENTION

Under the above-mentioned background, it is a primary object of the present invention to provide a process in which a light-diffusing sheet or plate having a solar radiation transmittance lower than the luminous transmittance thereof, and having a uniform performance, is prepared at a high industrial efficiency.

In accordance with the present invention, there is provided a process for the continuous preparation of light-diffusing methacrylic resin plates, which comprises casting a polymerizable material composed mainly of methyl methacrylate or a partially polymerized product thereof, and containing a polymerization initiator and a light diffusing agent, in a space defined by confronting surfaces of two endless belts running in the confronting state and gaskets interposed between the belt surfaces in the vicinity of both side ends of the belts and running with the belts, and polymerizing the polymerizable material, wherein a leaf-form light diffusing agent which has an average maximum diameter of 3 to 100 $\mu$m and a luminous transmittance of at least 20% and is insoluble in the monomer, and of which the product [n·d] of the refractive index n and the thickness d ($\mu$m) is 0.2 to 0.3 $\mu$m, is incorporated in an amount of 0.2 to 3.0% by weight based on the total weight of the polymerizable material; and pairs of upper and lower carrier rolls are disposed to support and move the two endless belts and maintain the desired distance between the two endless belts, and, while the polymerizable material is still flowable, a compressive force is applied on the belts at least one time, which force has a magnitude such that the maximum value of the distance between the two belts is within the range of from (l+1) mm to (l+0.02) mm and the minimum value of the distance between the two belts is within the range of from (l−1) mm to (l−0.02) mm, in which l represents the value (mm) of the average distance between the two belts determined from the polymerization conversion and the temperature, so that a predetermined plate thickness is obtained after polymerization.

DESCRIPTION OF THE PREFERRED EMBODIMENTS

Figure 1:
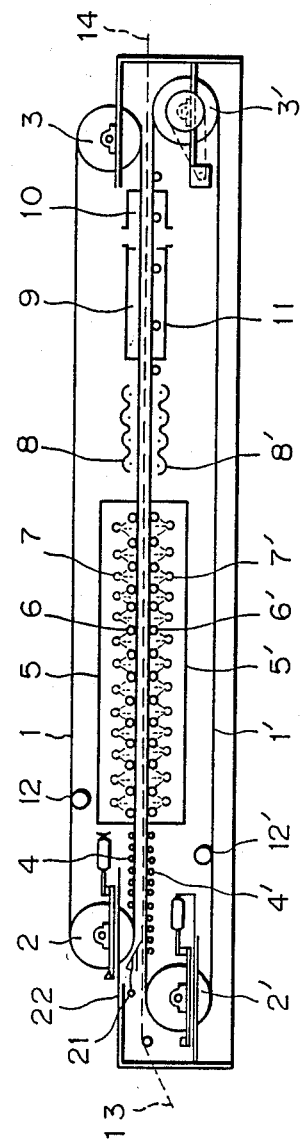
FIG. 1 is a front view of an entire apparatus for use in carrying out the process of the present invention.

The present invention will now be described in detail.

As the starting material of the base resin in the present invention, there can be used methyl methacrylate alone or an unsaturated monomer mixture composed mainly of methyl methacrylate, or a partially polymerized product of methyl methacrylate or the unsaturated monomer mixture. As the unsaturated monomer composed mainly of methyl methacrylate, there can be mentioned a mixture of methyl methacrylate and a copolymerizable monoethylenically unsaturated compound and/or a copolymerizable polyfunctional compound. As the monoethylenically unsaturated compound, there can be mentioned, for example, methacrylic acid esters, other than methyl methacrylate, acrylic acid esters such as methyl acrylate and ethyl acrylate, and styrene. As the polyfunctional compound, there can be mentioned, for example, glycol dimethacrylate and diallyl methacrylate, diallyl phthalate and diethylene glycol bis-allyl carbonate.

As the leaf-form light diffusing agent, those which have a good transparency in the visible region (i.e., having a luminous transmittance of at least 20% as measured according to ASTM D 1003) and are insoluble in the monomer are used in the present invention. Such light diffusing agents include substances capable of forming a plate crystal, such as basic lead carbonate, bismuth trichloride mica, and mica coated with titanium oxide, flaky inorganic glasses such as dense flint glass, dense lanthanum flint glass, dense lathanum crown glass, dense tantalum flint glass, and tantalum crown glass, and plastic films. Of these, basic lead carbonate, mica coated with titanium oxide, and inorganic glass are preferable. Materials that can be used in the present invention are not limited to those mentioned above.

In the leaf-form light diffusing agent used in the present invention, the product [n·d] of the refractive index n and the thickness d ($\mu$m) is 0.2 to 0.3 $\mu$m, preferably 0.22 to 0.26 $\mu$m, and the average maximum diameter is 3 to 100 $\mu$m, preferably 5 to 20 $\mu$m. The average maximum diameter means the average value of the maximum diameter of each leaf-form light diffusing agent.

The reason why the product [n·d] of the refractive index n and the thickness d is limited to 0.2 to 0.3 $\mu$m in the leaf-form light diffusing agent used in the present invention is as follows. When the preparation process of the present invention is adopted, the leaf-form light diffusing agent dispersed in the sheet-form polymerizable material is aligned at the time of polymerization so that the main surface of the leaf is parallel to the surface of the sheet-form polymerizable material in contact with the endless belt. As the result, a structure formed wherein, seemingly, many thin layers differing in refractive index are laminated. According to the theory of multipath reflection, with reference to rays incident on the resin plate prepared according to the present invention, the reflected light R at the incident angle of 0° to the incident light I is expressed by the following formula (1):

$$R = I\left(1 - \frac{1}{1 + F\sin^2\frac{\delta}{2}}\right) \quad (1)$$

wherein F is equal to $$\frac{4N}{(1-N)^2},$$

N is equal to $$\left(\frac{n-n'}{n+n'}\right)^2,$$

n' represents the refractive index of the methacrylic resin substrate, n represents the refractive index of the leaf-form light diffusing agent, and $\delta$ is equal to $4\pi nd/\lambda$, where d represents the thickness ($\mu$m) of the leaf and $\lambda$ represents the wavelength of the light. From the formula (1), it is seen that in order to reduce R in the visible ray wavelength region of 0.4 to 0.6 $\mu$m and increase R in the near infrared wavelength region of 0.8 to 1.5 $\mu$m, the product [n·d] should be approximately 0.2 to 0.3 $\mu$m. Note, in the case where the base resin is polymethyl methacrylate and the leaf-form light diffusing agent is basic lead carbonate, n is 2.1 and n' is 1.49, and the luminous transmittance is highest when the product [n·d] is 0.24, that is, d is 0.12 $\mu$m.

Note, if the average maximum diameter of the leaf-form light diffusing agent is smaller than 3 $\mu$m, since the quantity of diffused light is increased, the characteristic multipath reflection effect of the present invention, that is, the feature that the solar radiation transmittance is lower than the luminous transmittance, cannot be attained. If the average maximum diameter of the leaf-form light diffusing agent exceeds 100 $\mu$m, the dispersion of the leaf-form light diffusing agent in the methacrylic resin plate as the substrate and the alignment of the diffusing agent are unsatisfactory.

Polymerization initiators customarily used for cast polymerization for the production of methacrylic resins may be used. For example, there can be mentioned azo type and peroxide type polymerization initiators such as azobisisobutyronitrile, 2,2'-azobis(2,4-dimethylvaleronitrile) and lauryl peroxide. Furthermore, a release agent for separation from the casting mold, an ultraviolet absorber, a thermal stabilizer, and a colorant may be incorporated as assistants according to need.

In the present invention, it is indispensable that, while the endless belts are passed through between a plurality of paired upper and lower carrier rolls supporting and moving the endless belts before the polymerizable material cast between the endless belts is polymerized under heating, a compressive force must be applied onto the belts at least one time, which force is of a magnitude such that the maximum value of the distance between the two belts is within the range of from $(l+1)$ mm to $(l+0.02)$ mm and the minimum value of the distance between the two belts is within the range of from $(l-1)$ mm to $(l-0.02)$ mm, in which l represents the value (mm) of the average distance between the two belts determined from the polymerization conversion of the polymerizable material and the temperature thereof. This condition is satisfied usually by applying a compressive force corresponding to a linear load of 0.001 to 10.0 kg/cm along the lateral direction of the endless belts by means of the carrier rolls. The endless belts are thus compressed, whereby the polymerizable material containing the leaf-form light diffusing agent, which is held between the endless belts, is uniformly and slightly forcibly moved and the alignment of the leaf-form light diffusing is promoted. The compressive force is applied preferably at least 5 times, more preferably 5 to 100 times.

In the present invention, the viscosity of the polymerizable liquid material is 0.1 to 50 poises, preferably 2 to 20 poises. This polymerizable liquid material is continuously supplied to a well-known casting device (as disclosed in Japanese Examined Patent Publications No. 46-41,602 and No. 47-34,815 and French Pat. No. 2,027,385) and is continuously cast between the endless belts by the casting device. Accordingly, the formation of uneven portions, as observed in the batchwise casting process, that is, the cell casting process, can be prevented.

Figure 2:
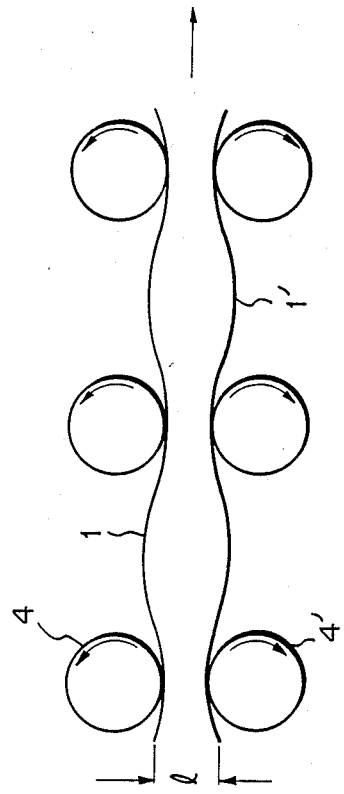
FIG. 2 is a diagram illustrating the portion of carrier rolls and a polymerizable material in the fluid state.

The present invention will now be described with reference to the accompanying drawings. FIG. 1 is a front view of an entire apparatus for use in carrying out the present invention. FIG. 2 is a diagram illustrating carrier rolls and a resin plate in the fluid state. Referring to FIG. 1, a tension is given to each of two endless belts 1 and 1' arranged above and below by main pulleys 2, 3 and 2', 3', and they are driven so that they run at the same speed. Pairs of upper and lower carrier rolls 4, 4' and 6, 6' support the belts 1 and 1' horizontally to regulate the distance between the belt surfaces, that is, the thickness of the polymerizable liquid material. The polymerizable liquid material is fed by a metering pump and supplied between the endless belts 1 and 1' by feeder 21 of casting device 22. The portions in the vicinity of both side ends of the belts 1 and 1' between the surfaces of the belts 1 and 1' are sealed by elastic gaskets 13.

The polymerizable liquid material is supplied on the endless belt 1 through a casting path from the casting device 22, and with running of the endless belts 1 and 1', the polymerizable liquid material is heated by warm water sprays 7 and 7' to polymerize in a first polymerization zone 5, 5'. Then, in a second polymerization zone 8, 8', the material is heated by a far infrared ray heater to complete polymerization. The formed polymer is passed through a warming zone 9 and a cooling zone 10 and is withdrawn as a plate product 14. Reference numeral 11 represents a roller for supporting the belts, and reference numerals 12 and 12' represent rollers in contact with the back surfaces of the belts to control meandering of the belts.

In the present invention, in the region before the point of completion of polymerization and solidification of the polymerizable liquid material cast between the endless belts 1 and 1', a linear load is applied to the endless belts 1 and 1' in the lateral direction of the endless belts 1 and 1' by means of pairs of upper and lower carrier rolls 4 and 4', whereby the endless belts 1 and 1' are moved in the slight wavy configuration shown in FIG. 2. The linear load must be such that the maximum value of the distance between the endless belts 1 and 1' is in the range of from $(1+1)$ mm to $(1+0.02)$ mm and the minimum value of the distance between the endless belts 1 and 1' is in the range of from $(1-1)$ mm to $(1-0.02)$ mm, in which l represents the value (mm) of the average distance between the endless belts 1 and 1' determined from the polymerization conversion of the polymerizable material and the temperature, so that a predetermined plate thickness is obtained. More specifically, the linear load is usually 0.001 to 10.0 kg/cm, though this linear load is changed to some extent according to the thickness and tension of the endless belts 1 and 1', the viscosity of the polymerizable liquid material, the distance between the upper and lower carrier rolls 4 and 4', the pressing load of the carrier rolls 4 and 4', and the elasticity of the carrier rolls 4 and 4'.

In the present invention, if the distance between the endless belts 1 and 1' exceeds the limit of $(1+1)$ mm or $(1-1)$ mm of the maximum or minimum value while the polymerizable material is still flowable, the thickness precision at the time of completion of polymerization is reduced. On the other hand, if the maximum value is smaller than $(1+0.02)$ mm or the minimum value is larger than $(1-0.02)$ mm, the alignment of the leaf-form diffusing agent in the resin plate is unsatisfactory and the transmitted light or reflected light is apt to become uneven. Moreover, the reduction of the solar radiation transmittance relative to the luminous transmittance is insufficient.

Since the endless belts are moved in the wavy configuration, the leaf-containing polymerizable liquid material is forced forward and backward with respect to the advance direction of the belts, with the position pressed by the paired upper and lower carrier rolls 4 and 4' as the center. The intended effect is attained if a linear load of 0.001 to 10.0 kg/cm is applied at least one time by means of the carrier rolls 4 and 4'. If this forced movement is repeated every time the endless belts are passed through between a plurality of the paired upper and lower carrier rolls 4 and 4', the alignment of the leaf-form diffusing agent in the polymerizable liquid material is further promoted.

The present invention will now be described with reference to the following examples and comparative examples that by no means limit the scope of the invention. Note, all of "parts" are by weight in the examples and comparative examples.

The following plate-preparing apparatus was used as the polymerization apparatus.

Two mirror-polished stainless steel endless belts 1 and 1' each having a thickness of 1 mm, a width of 800 mm and lengths of 15.5 m and 16.5 m, respectively, were tensioned above and below by means of main pulleys 2, 3 and 2', 3' each having a diameter of 1000 mm, and were driven so that the confronting surfaces of the endless belts 1 and 1' were moved in the same direction at the same speed. The total length of the first polymerization zone 5, 5' of this apparatus was 4 m, and in the upstream portion of 2 m in the first polymerization zone, 10 pairs of upper and lower flexible carrier rolls 4 and 4' each having a diameter of 90 mm were disposed at intervals of 200 mm and the linear load in the lateral direction of the endless belts was 0.01 to 0.2 kg/cm, to regulate the positions of the endless belts 1 and 1' and the distance between the confronting surfaces of the belts. In the first polymerization zone 5, 5', warm water maintained at 80° C. was sprayed to the outer sides of the confronting surfaces of the endless belts by warm water sprays 7 and 7', whereby the polymerizable liquid material was heated. The second polymerization zone 8, 8' had a length of 2 m, and the back surfaces of the endless belts 1 and 1' were heated above 120° C. by a far infrared ray heater to effect a heat treatment.

The resin plates were evaluated according to the following methods.

The appearance was evaluated by the naked eye observation. The luminous transmittance and solar radiation transmittance were determined according to the method of JIS R-3208 using a spectrophotometer Model Hitachi 330.

EXAMPLE 1

In 100 parts of partially polymerized methyl methacrylate (polymerization conversion =20%) as the polymerizable material was incorporated and sufficiently dispersed 0.3 part of basic lead carbonate having an average thickness of 0.12 $\mu$m, an average maximum diameter of 10 $\mu$m, and a refractive index of 2.1. Then, 0.01 part of sodium dioctyl sulfosuccinate as a release agent, 0.02 part of nitrocellulose as a dispersing agent, 0.04 part of 2,2'-azobis(2,4-dimethylvaleronitrile) as a polymerization initiator, and 0.01 part of 2-(2-hydroxy-5-methylphenyl)-2H-benzotriazole as an ultraviolet absorber were incorporated and dissolved in the mixture. The resulting polymerizable liquid material was deaerated and cast from the casting device 22 of the polymerization apparatus shown in FIG. 1, which was set so that the plate thickness was 3 mm, and the material was passed through the continuous polymerization apparatus and was withdrawn as a plate product 14 in which polymerization was completed. The resin plate had a uniform iris color, with a luminous transmittance of 57% and a solar radiation transmittance of 44%. Thus, it was confirmed that the solar radiation transmittance was much lower than the luminous transmittance.

EXAMPLE 2

In 100 parts of partially polymerized methyl methacrylate (polymerization conversion =20%) as the polymerizable material was incorporated and sufficiently dispersed 0.1 part of titanium oxide-coated mica having an average thickness of 0.095 μm, an average maximum diameter of 15 μm and a refractive index of 2.7, and the mixture was polymerized in the same manner as described in Example 1 to obtain a resin plate having a thickness of 3 mm. The properties of the obtained resin plate are shown in Table 1.

COMPARATIVE EXAMPLE 1

In 100 parts of partially polymerized methyl methacrylate (polymerization conversion=20%) as the polymerizable material was incorporated and dispersed 0.3 part of basic lead carbonate having an average thickness of 0.55 μm, an average maximum diameter of 5 μm and a refractive index of 2.1. The mixture was polymerized in the same manner as described in Example 1 to obtain a resin plate having a thickness of 3 mm. The properties of the obtained resin plate are shown in Table 1.

COMPARATIVE EXAMPLE 2

In 100 parts of partially polymerized methyl methacrylate (polymerization conversion=20%) as the polymerizable material was incorporated and dispersed 0.3 part of basic lead carbonate having an average thickness of 0.16 μm, an average maximum diameter of 10 μm and a refractive index of 2.1. The mixture was polymerized in the same manner as described in Example 1 to obtain a resin plate having a thickness of 3 mm. The properties of the resin plate are shown in Table 1.

COMPARATIVE EXAMPLE 3

In 100 parts of partially polymerized methyl methacrylate (polymerization conversion=20%) as the polymerizable material was incorporated and dispersed 1.2 parts of barium sulfate having an average maximum diameter of 4 μm. The mixture was polymerized in the same manner as described in Example 1 to obtain a resin plate having a thickness of 3 mm. The properties of the obtained resin plate are shown in Table 1.

COMPARATIVE EXAMPLE 4

In 100 parts of partially polymerized methyl methacrylate (polymerization conversion=20%) as the polymerizable material was incorporated and dispersed 0.3 part of the same basic lead carbonate having an average thickness of 0.12 μm, an 10 μm and a refractive index of 2.1 as used in Example 1. Then, 0.01 part of sodium dioctyl sulfosuccinate as a release agent, 0.02 part of nitrocellulose as a dispersing agent, 0.04 part of 2,2'-azobis(2,4-dimethylvaleronitrile) as the polymerization initiator and 0.01 part of 2-(2-hydroxy-5-methylphenyl)-2H-benzotriazole as the ultraviolet absorber were incorporated and dissolved in the mixture. The polymerizable liquid mixture was deaerated and cast in a cell which was defined by two glass sheets and gaskets so that the plate thickness was 3 mm. Polymerization was carried out and completed according to customary procedures. The obtained resin plate was taken out from the glass cell. The properties of the resin plate are shown in Table 1.

TABLE 1

| Resin Plate | Appearance | Luminous transmittance (%) | Solar radiation transmittance (%) |
| --- | --- | --- | --- |
| Example 1 | Uniform iris color | 57 | 44 |
| Example 2 | Uniform iris color | 60 | 50 |
| Comparative Example 1 | Uniform pearl color | 30 | 30 |
| Comparative Example 2 | Uniform iris color | 47 | 55 |
| Comparative Example 3 | Uniform white color | 50 | 53 |
| Comparative Example 4 | Uneven iris color | 52 | 43 |

From the results obtained in the examples and comparative examples, it is seen that if a transparent leaf-form light diffusing agent of which the product [n·d] of the refractive index n and the thickness d (μm) is 0.2 to 0.3 μm is aligned in a methacrylic resin plate, there can be obtained a light-diffusing plate in which the solar radiation transmittance is lower than the luminous transmittance. It also is seen that, in the case of the conventional cell casting polymerization process, the color of the obtained resin plate is uneven, but if a linear load is applied according to the specified procedure in the present invention, a light-diffusing resin plate can be obtained in which the color is uniform and the ratio of the luminous transmittance to the solar radiation transmittance is high.

I claim:

1. A process for continuous preparation of light-diffusing methacrylic resin plates comprising
   (a) introducing into a first end of a casting space a polymerizable material comprising
      (i) methyl methacrylate or a partially polymerized product thereof;
      (ii) 0.2 to 3.0% by weight of a light-diffusing agent that is insoluble in the polymerizable material, said light-diffusing agent having a maximum average diameter of 3 μm to 100 μm, a visible light transmittance of at least 20% and a refractive index, n, and a thickness, d, such that the product, n×d, is between 0.2 and 0.3 μm; said casting space being defined by facing surfaces of two moving belts and gaskets interposed between the belt surfaces in the vicinity of both edges of the belts and moving therewith;
   (b) progressively polymerizing the polymerizable material while moving it with the belts from the first end of the casting space toward a second end of the casting space; and
   (c) applying a compressive force to the belts at at least one point between said first and second ends of the casting space at which the polymerizable material is still flowable such that the distance between the two belts is reduced to a minimum distance and then allowing the distance between the belts to expand such that the distance between the two belts increases to a maximum distance, wherein the amount of force applied is such that the maximum distance between the two belts has a value of between (l+1) mm and (l+0.2) mm and the minimum distance has a value of between (l−1) mm and (l−0.2) mm, l being the average distance between the two belts, said average distance being determined so as to yield a plate of particular thickness while accounting for effects of polymerization and temperature.

2. A process of the preparation of light-diffusing methacrylic resin plates according to claim 1, wherein the maximum diameter of the light diffusing agent is 5 to 20 μm.

3. A process for the preparation of light-diffusing methacrylic resin plates according to claim 1, wherein the light-diffusing agent is selected from the group consisting of basic lead carbonate, mica coated with titanium oxide, and inorganic glass.

4. A process for the preparation of light-diffusing methacrylic resin plates according to claim 1, wherein the product of the refractive index n and the thickness d is 0.22 to 0.26 μm.

5. A process for the preparation of light-diffusing methacrylic resin plates according to claim 1, wherein the magnitude of the compressive force is equal to a linear load of 0.001 to 10.0 kg/cm applied along the transverse direction of the endless belts.

6. A process for the preparation of light-diffusing methacrylic resin plates according to claim 1, wherein the compressive force is applied 5 to 100 times.

7. A process according to claim 1, wherein the compressive force is applied prior to initiating polymerization.

* * * * *